UNITED STATES PATENT OFFICE.

CHARLES B. JACOBS, OF EAST ORANGE, NEW JERSEY, ASSIGNOR TO THE AMPERE ELECTRO-CHEMICAL COMPANY, OF SAME PLACE.

PROCESS OF MANUFACTURING SOLUBLE BARIUM COMPOUNDS.

SPECIFICATION forming part of Letters Patent No. 624,041, dated May 2, 1899.

Application filed October 12, 1898. Serial No. 693,306. (No specimens.)

*To all whom it may concern:*

Be it known that I, CHARLES B. JACOBS, a citizen of the United States, and a resident of East Orange, in the county of Essex and State of New Jersey, have invented certain new and useful Improvements in Processes of Manufacturing Soluble Barium Compounds, of which the following is a specification.

The object of the present invention is to provide an economical process for the manufacture of soluble barium compounds directly from a native ore, such as barytes, (barium sulfate.) The process is carried out in an electric furnace at the temperature of which when barytes is mixed with sufficient carbon to reduce a part only of the barium sulfate to barium sulfid a double reaction takes place, a mixed charge of barium sulfid and barium sulfate being produced in the first part of the reaction and barium oxid and barium sulfid at a later stage of the operation. Under this treatment the original sulfate may be converted into sixty per cent. of barium oxid and about forty per cent. of barium sulfid with a small proportion of unconverted sulfate, amounting to less than one per cent., whereas in the ordinary process the yield is about sixty per cent. of barium sulfid and forty per cent. of unconverted sulfate. The small proportion of insoluble sulfate may be easily separated and the soluble compounds recovered separately by the usual treatment. The operation may be conducted in any type of electric furnace; but the temperature attainable in a combustion-furnace is insufficient to carry out the reaction.

As an example of the manner in which the process may be carried out we may take four parts of barium sulfate and four of carbon, which react upon one another at an early stage of the heating and produce barium sulfid and barium sulfate, as will be understood from the following reaction:

Under a continuance of the heating at the high temperature attainable in an electric furnace a double reaction sets in between the sulfid thus formed and the unconverted sulfate—for example,

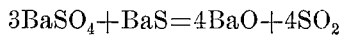

It is not possible to convert the whole of the charge into oxid, as indicated by the last equation, for the reason that the reaction first set forth takes place much more rapidly than the barium sulfid produced thereby will react with the unconverted sulfate, thus destroying the relative proportions for the second reaction and leaving a small proportion of unconverted sulfate, amounting to less than one per cent., in the resulting product. The two principal products, however, barium oxid and barium sulfid, are both soluble compounds and are in a condition for convenient separation. With a charge consisting of about twenty parts, by weight, of sulfate and one of carbon a product may be obtained containing sixty per cent. of barium oxid and about forty per cent. of barium sulfid, these proportions being slightly modified by a small percentage of unconverted sulfate present in the residual product.

The amount of electrical energy necessary in the production of a ton of the finished product is about sixteen hundred and thirty-six kilowatt hours or about .81 kilowatt hours per pound.

It is evident that the treatment herein described offers marked advantages over the ordinary furnace treatment, where the final product is a mixture containing sixty per cent. of barium sulfid and forty per cent. of unconverted sulfate.

Having thus described my invention, what I claim as new, and desire to secure by Letters Patent, is—

1. The process of making an oxid from a sulfate consisting in heating a mixture of sulfate and sufficient carbon to extract part only of the oxygen of the sulfate thereby producing in the first instance a mixture of the sulfid and sulfate, and then continuing the heating in an electric furnace until sulfur dioxid ceases to escape.

2. The process of making an oxid from a sulfate consisting in heating in an electric furnace a mixture of sulfid and sulfate, in such proportions that the oxid of the metal will result, until sulfur dioxid ceases to escape.

3. The process of making barium oxid from barytes consisting in heating in an electric furnace a mixture of barytes with carbon in sufficient quantity to extract a part only of the oxygen from the barytes.

In testimony whereof I have hereunto subscribed my name this 5th day of October, A. D. 1898.

CHARLES B. JACOBS.

Witnesses:
C. A. WESTERVELT,
ROBT. H. READ.